Jan. 26, 1965  K. B. SCHÖNENBERGER  3,166,789
APPARATUS FOR PRODUCING BOXLIKE CONTAINERS
Filed March 5, 1962  6 Sheets-Sheet 1

Fig.1.

INVENTOR.
KURT BERNHARD SCHOENENBERGER
BY Dicke + Craig
ATTORNEYS

Jan. 26, 1965 K. B. SCHÖNENBERGER 3,166,789
APPARATUS FOR PRODUCING BOXLIKE CONTAINERS
Filed March 5, 1962 6 Sheets-Sheet 2

INVENTOR.
KURT BERNHARD SCHOENENBERGER
BY Dicke + Craig
ATTORNEYS

Jan. 26, 1965  K. B. SCHÖNENBERGER  3,166,789
APPARATUS FOR PRODUCING BOXLIKE CONTAINERS
Filed March 5, 1962  6 Sheets-Sheet 5

INVENTOR.
KURT BERNHARD SCHOENENBERGER
BY Dicke + Craig
ATTORNEYS

United States Patent Office 3,166,789
Patented Jan. 26, 1965

3,166,789
APPARATUS FOR PRODUCING BOXLIKE
CONTAINERS
Kurt Bernhard Schönenberger, Esslingen (Neckar), Germany, assignor to Furnier- und Sperrholzwerk J. F. Werz, Jr., K.G., Werzalit-Pressholzwerk, Oberstenfeld, Oberstenfeld, Kreis Ludwigsburg, Germany
Filed Mar. 5, 1962, Ser. No. 177,315
16 Claims. (Cl. 18—16)

The present invention relates to an apparatus for producing boxlike containers which are open at one side and provided with individual compartments formed by partitions of any desired shape, and which may be designed for a large variety of purposes such as furniture drawers, or as shipping or storing containers for bottles, cans, or any other objects or parts which should be kept separately and at certain distances from each other.

Prior to this invention, such boxes were made primarily of wood by normal carpentry or also of sheet metal. Their production always required a considerable length of time and was therefore rather expensive since it could only be carried out by a series of operations.

It is an object of the present invention to produce such boxlike containers much more efficiently and inexpensively in a single, very quick operation by molding them of suitable fibrous materials which are not capable of flowing, that is, preferably of finely shredded wood chips or the like which are mixed with a suitable binder, preferably a plastic.

It is another object of the invention to carry out such a single molding operation by simultaneously employing molding materials of different kinds for producing one article so that different parts thereof, for example, the outer frame, the bottom, and the partitions, will have different degrees of solidity, different wearing factors, or other different properties. The invention thus permits the simultaneous application of, for example, a coarse chip mixture for making the outer frame, while the partitions may be molded of a sawdust mixture.

A further object of the invention is to provide a machine for producing such boxlike containers. This machine essentially comprises two hydraulic or mechanical presses which act in opposite directions to each other, and of a mold which is mounted between these two presses and in which parallel cores are provided which are of a cross-sectional shape in accordance with that of the desired inner compartments of the container to be molded and are spaced from each other at a distance equal to the thickness of the partitions forming the compartments. The machine further comprises a larger core which has a size in accordance with the entire cross-sectional area of the space between the outer walls of the desired container for producing the open side of the latter above the partitions which communicates with and terminates into the individual compartments which are formed by the partitions. Depending upon the desired shape of the container, the die or dies which form the inside thereof may be provided with straight surfaces extending vertically to the bottom surface of the container so as to produce similar straight container walls, or some or all of them may be provided with slightly inclined surfaces so as to produce similarly inclined container walls. By providing the walls of the plungers with sharpedged projections which are associated with the upper edge of the mold of a corresponding shape, it is then also possible to attain container walls with handle-forming apertures as are conventional, for example, in boxlike bottle containers to permit them to be more easily manipulated or carried.

According to the invention, the compartment forming cores which are provided within the mold chamber are acted upon by the lower press and before the molding material is filled into the mold all of them are moved simultaneously upwardly to a certain level so that the molding material will be compressed between them and they will thereafter again be pressed downwardly by the upper press die until they reach a common lower stop.

Another feature of the machine according to the invention consists in the provision of a special proportioning and distributing feeder for filling the mold with the molding material. This mechanism forms a separate unit which may be moved or pivoted from one side of the machine between the upper press die and the mold and then distributes the molding material in the accurate proportions into the spaces between the individual cores so that all of the partitions will be made of exactly the same thickness and strength. Suitable distributing means also permit molding materials of different properties to be filled into the mold and to be distributed in the exact predetermined proportions to the particular points where they are desired.

The machine according to the invention may also be employed for carrying out a preforming operation of blanks. The boxlike containers are then only preformed and prepressed without the application of heat so that the binder will not be set. Thereafter, the blanks may be placed into a similar machine which is heated but in which the respective elements of the machine, for example, the dies, intermediate cores, and pressure plates have to be moved for only a few millimeters.

The above-mentioned as well as further objects, features, and advantages of the invention will become more clearly apparent from the following detailed description thereof, particularly when the same is read with reference to the accompanying diagrammatic drawings, in which—

FIG. 2a is a partial plan view of the double rails for supporting the feed hopper;

FIGURE 14 shows a plan view of a similar box but provided with round compartments; while

Figure 1:
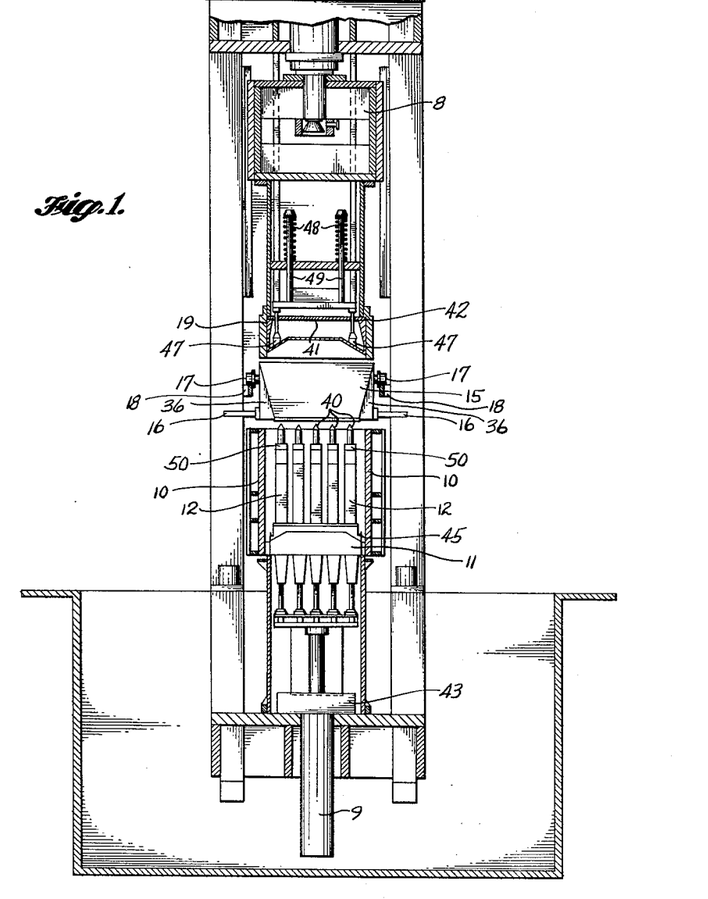
FIGURE 1 shows a vertical section of the machine according to the invention.
Figures 2, 20:
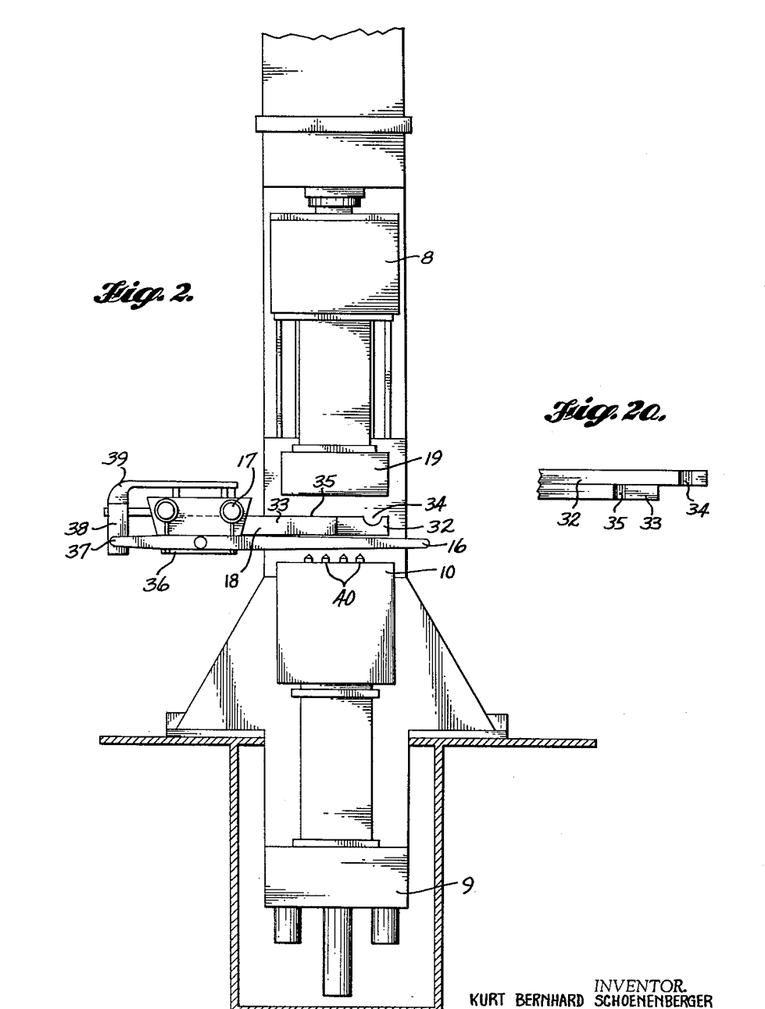
FIGURE 2 shows a side view, partly in section, of the machine according to FIGURE 1, in which, however the front part of the machine frame is omitted for a clearer illustration.
Figure 3:
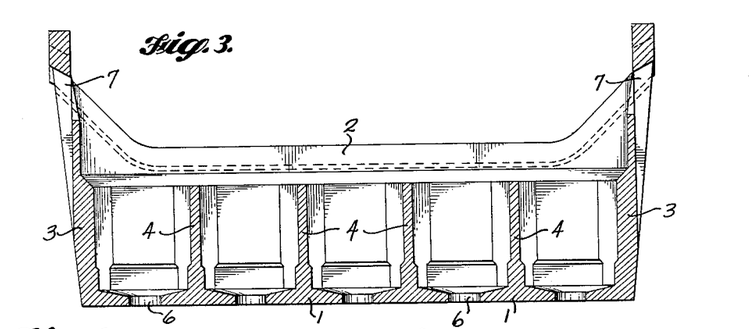
FIGURE 3 shows a cross section of a bottle container which may be produced by the machine according to FIGURES 1 and 2.
Figure 4:
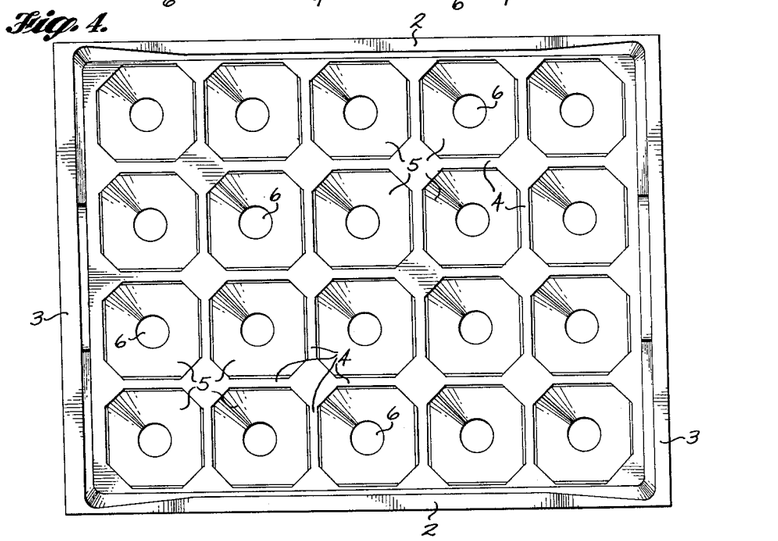
FIGURE 4 shows a plan view of the container according to FIGURE 3.
Figure 5:
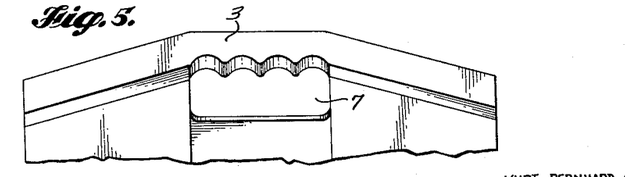
FIGURE 5 shows an enlarged side view of a part of a transverse side wall of the container according to FIGURE 3.

As illustrated particularly in FIGURES 1 and 2, the machine according to the invention consists of a hydraulic press for producing boxlike containers, for example, of the type as illustrated in FIGURES 3 to 5, having a bottom 1, longitudinal walls 2, and transverse walls 3, and provided with partitions 4 which divide the inside of the box into a plurality of equal parallel compartments 5, for example, for storing or transporting bottles. At the center of the bottom of each compartment 5, a drain opening 6 is provided for allowing condensed or washing water to run out. The four outer walls 2 and 3 of the box project above the upper edges of the partitions 5, and the two opposite transverse walls 3 are higher than the longitudinal walls 2 and extend at a slight outwardly inclined angle, and they are provided near their upper edges with apertures 7 forming handles for easily manipulating the box.

The machine according to FIGURES 1 and 2 for producing such boxes comprises an upper press 8 which is operated hydraulically, a lower press 9 extending coaxially thereto, and a box-shaped mold 10 between the two presses in which a stationary main core 11 of a shape and dimensions in accordance with those of the inner limits of the part of the box to be molded above the partitions 5, and a plurality of smaller secondary cores 12 in accordance with the number and dimensions of the individual compartments 5 are provided. These compartment-forming cores 12 are spaced from each other at a distance equal to the webs forming the partitions 4 of the box to be molded, and they are adapted to be moved upwardly and downwardly in suitable apertures in the main core 11. When the press is in the charging position and before the molding material is filled into the mold 10, these cores are moved upwardly by the press 9 so as to project upwardly from the main core 11 to such an extent that only the precise amount of molding material can be filled in a loose condition into the gaps between the individual cores 12 as is required in order to provide the finally molded box with partitions of the exact density as desired. During this charging operation, also the gaps between the main core 11 and the outer walls 13 of the mold as well as between cores 12 and walls 13 are filled with a predetermined amount of loose material for molding the outer frame 2, 3 of the container. When the cores 12 are elevated to the position as shown in FIGURE 1 and after the gaps between them are filled, they are also covered with such a predetermined amount of molding material as is necessary to form the bottom 1 of the container. The container is therefore molded upside down with its openings facing downwardly and its bottom upwardly.

Figure 9:
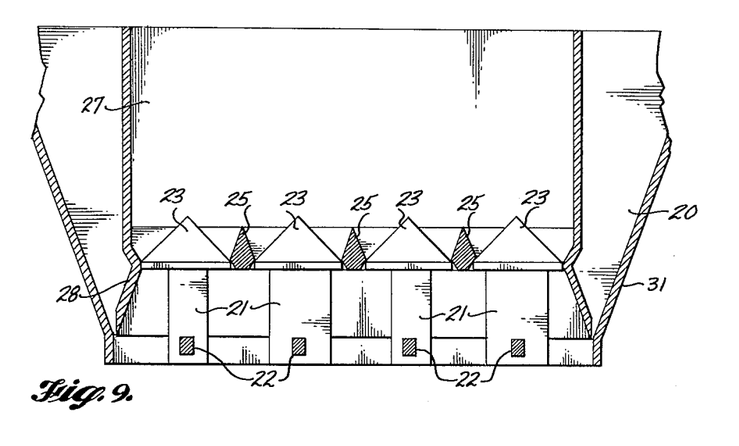
FIGURES 9 and 9a, respectively, show diagrammatic cross-sectional views of the proportioning and distributing feeder in the closed and open positions.
Figure 9A:
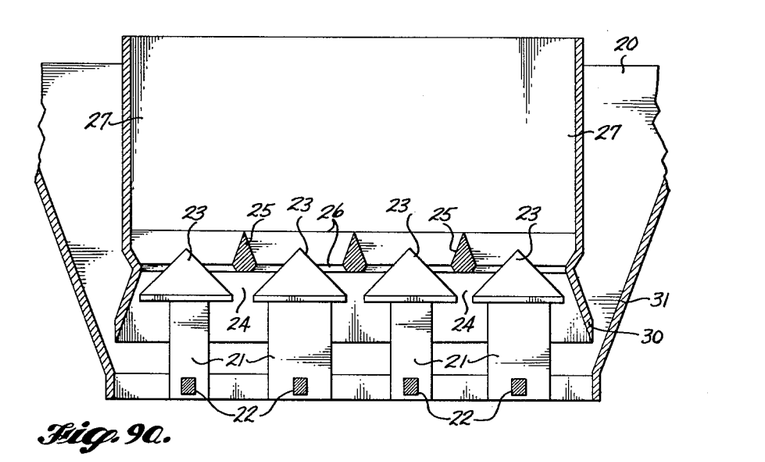
Figure 10:
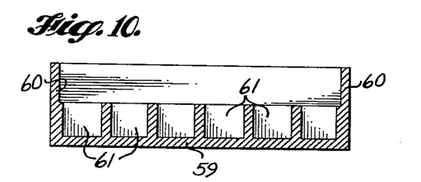
FIGURE 10 shows a longitudinal section of a box with vertical walls, square compartments, and a solid bottom which may be produced by the machine according to FIGURES 6 to 8.
Figure 11:
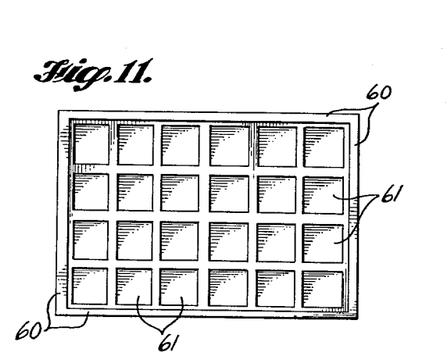
FIGURE 11 shows a plan view of the box according to FIGURE 10.
Figure 12:
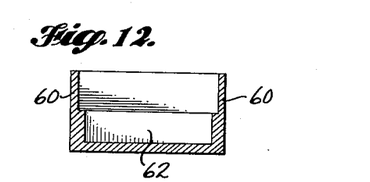
FIGURE 12 shows a longitudinal section of a similar box but provided with oblong compartments.
Figure 13:
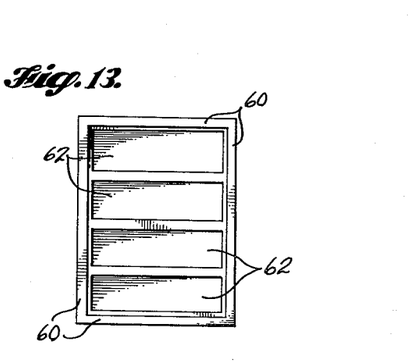
FIGURE 13 shows a plan view of the box according to FIGURE 12.
Figure 14:
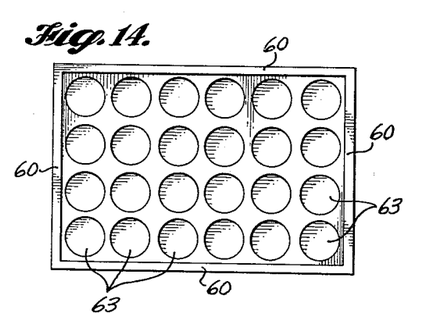
Figure 15:
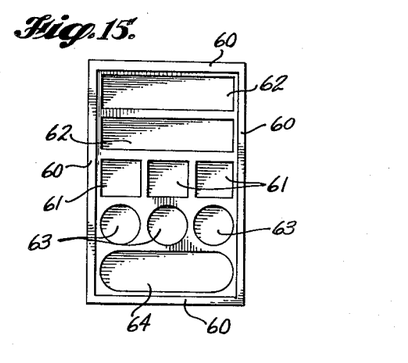
FIGURE 15 shows a plan view of a similar box but provided with oblong, round, and square compartments.

For charging the mold the machine according to the invention contains a proportioning and distributing feeder 15 which may be moved as a unit by means of handles 16 on rollers or wheels 17 along rails 18 from one side of the machine into the area between the upper die 19 in press 8 and the mold 10. As illustrated in FIGURES 9 and 9a this feeder 15 essentially consists of an outer funnellike hopper 20 and distributing members 21 which are secured by rods 22 to the hopper 20 and are preferably provided at their upper ends with pyramidal or conical distributing heads 23 and are in vertical alignment with the movable cores 12 of mold 10. The lower end of hopper 20 has a size substantially in accordance with the size of the bottom surface of the container to be molded. The adjacent distributing heads 23 are equally spaced from each other to form gaps 24 of a size substantially in accordance with the distance between the adjacent cores 12. These gaps 24 may be opened and closed by wedge-shaped plugs 25 which are secured on a metal screen 26 which is secured in an inner hopper 27, the lower end 28 of which underneath screen 26 is tapered outwardly so that its lower edge fits slidably into the lower end of the outer hopper 20. Thus, when hopper 20 with the distributing members 21 is lowered relative to the hopper 27 and plugs 25 thereon, the gaps 24 between the adjacent distributing heads 23 and between the outer heads 23 and the lower end 28 of hopper 27 are opened and also an additional gap 29 which is then formed between the lower edge 30 of the tapered part 28 of hopper 27 and the upwardly tapered wall 31 of hopper 20, as indicated in FIGURE 9a. The loose molding material which has previously been poured into the upper parts of both hoppers 20 and 27 is then accurately distributed through these gaps 24 and 29 to the corresponding gaps between core 11 and walls 13 of the mold and between the individual movable cores 12. Since the two hoppers 20 and 27 are separate from each other, the molding materials which are filled into them may be of different compositions so that the outer walls 2 and 3 of the boxlike container may be molded, for example, of a mixture of coarser chips, while the partitions 4 within the container may be molded, for example, of a sawdust mixture or the like.

If the molding material, for example, a sawdust mixture, which is filled into the inner hopper 27 is covered by a layer consisting of a coarse chip mixture, this last material will fall last upon the movable cores 12 so that the bottom of the box will also be of a more solid structure than the partitions 4. In this manner it is therefore possible to make all of those parts of the box which have to resist greater stresses, that is, the bottom and outer walls thereof, of a high-grade chip material and those parts which have to be less resistant, that is, the partitions 4, of a cheaper material. Feeder 15 will then distribute the different materials uniformly to the particular points where they are desired. The operation of opening the two hoppers 20 and 27 and of filling the mold 10 occurs automatically as soon as the feeder 15 is moved from the side into the charging position between the upper die 19 and mold 10. For this purpose rail 18 on each side of feeder 15 forms a double rail or two parallel rails 32 and 33, each of which has a width at least equal to the width of one of the wheels 17, and each rail or rail part 32 and 33 is provided with a recess 34 or 35. Wheels 17 on each side of feeder 15 are offset relative to each other so that one wheel 17 runs on rail 32 and the other wheel 17 on rail 33, and the two wheels are spaced from each other in accordance with the distance between recesses 34 and 35. Thus, when feeder 15 is moved from one side of the machine to the charging position, all wheels 17 will engage simultaneously into recesses 34 and 35 and feeder 15 will then be arrested in accurate vertical alignment with mold 10 and the upper die 19. Wheels 17 are rotatably mounted on a frame 36 carrying the outer hopper 20. Handles 16 which are used for moving the feeder 15 back and forth along rails 18 from levers which are connected to hopper 20 and are pivotable about an axis 37 on a slide member 38 which is slidable along rails 18 and also carries the inner hopper 27, for example, by means of a bracket 39. Thus, by means of handles 16 it is also possible after the charging operation to lift wheels 17 on hopper 20 or its frame 36 out of recesses 34 and 35 and back upon rails 18 to permit the entire feeder unit to be moved back to its original position as shown in FIGURE 2.

When wheels 17 engage into recesses 34 and 35, the resulting small downward movement of the outer hopper 20 relative to the inner hopper 27 then results in the outer hopper 20 dropping from the position as shown in FIGURE 9 to the position according to FIGURE 9a so that gaps 24 and 29 are opened and the molding material can drop into the mold.

After the mold has been charged, feeder 15 is moved toward the side, whereupon the hydraulic press 8 is operated to carry out its compression stroke and force the upper die 19 into mold 10. When die 19 then approaches the mold, the projecting pointed pins 40 on cores 12 which produce the drain holes 6 in the bottom 1 of the box, as shown in FIGURES 1 and 2, engage into corresponding apertures 41 in the upper die plate 42 whereby cores 12 are accurately centered. During the further downward movement of die 19, cores 12 are depressed and recede within the mold to a certain level which is determined by a stop 43.

As illustrated in FIGURE 1, the upper die 19 is provided with inwardly inclined side walls 44 at two opposite sides thereof which are adapted to produce the inclined outer walls 3 of the box, as illustrated in FIGURE 3. For producing the handle apertures 7 in these inclined walls 3, a pair of vertical cutting inserts 45 are secured to and project from the stationary main core 11 and a similar pair of vertical cutting inserts 46 are secured to the lower ends of the side walls of die 19. These upper and lower cutting inserts 45 and 46 are operatively associated with each other and near the end of the compression stroke of die 19 they cut from opposite sides and in opposite directions into the molded inclined side walls 3 and thereby cut out the handle apertures 7.

As indicated in FIGURE 1, the upper die contains ejectors 47 which are slidable in the upper die plate 42 and are acted upon by springs 48 on guide rods 49. During the downward compression stroke of die 19, springs 48 are released, while during the return stroke of the die after the molding operation is completed and provided the molded box adheres to the inside of die 19, ejectors 26 are pressed by springs 48 against the molded box and thus eject the same from die 19. The movable cores 12 which are raised and lowered by the press 9 may also serve as ejectors in the event that the molded box remains in mold 10 during the return stroke of the upper die 19. For this purpose, the lower press 9 may then be elevated so that the upper surfaces 50 of cores 12 will press against the bottom 1 of the molded box and lift the box partly or entirely out of mold 10.

Figure 6:
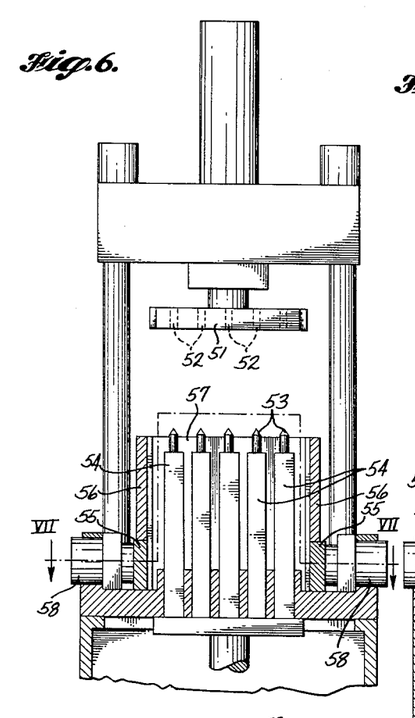
FIGURE 6 shows a vertical section of the essential forming parts of a modification of the machine according to the invention in the charging position for producing boxes with vertical side walls.
Figure 7:
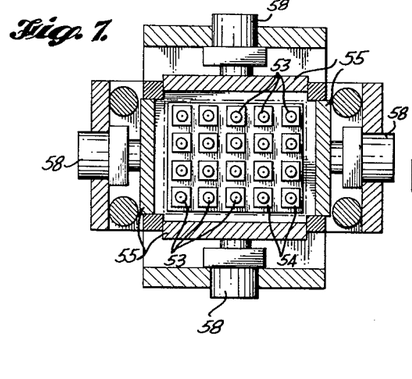
FIGURE 7 shows a cross section taken along line VII—VII of FIGURE 6.
Figure 8:
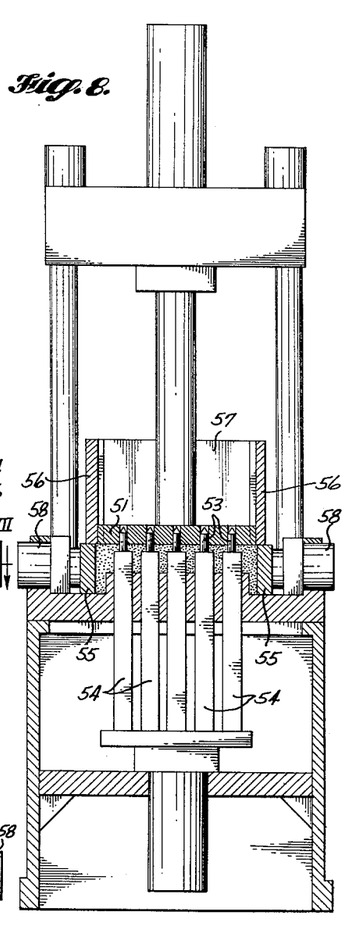
FIGURE 8 shows a section similar to that of FIGURE 6, but with the machine in the molding position.

FIGURES 6 to 8 illustrate a modification of the inventive machine which is designed for producing molded boxes with straight side walls, for example, of the type as shown in FIGURES 10 to 15. The upper die 51 consists in this case of a flat plate which is provided with apertures 52 for receiving the centering pins 53 on cores 54 during the compression stroke of the die. During the molding operation, at first the outer walls of the box are formed by compression from above by die 51. When die 51 has arrived at the end of its compression stroke, pressure plates 55 which in the retracted position are substantially in vertical alignment with and form an extension of the outer walls 56 of the mold 57, are moved inwardly by separate pistons in hydraulic cylinders 58 and exert a lateral pressure upon each side wall of the partly molded box in mold 57. Since all side walls of such a box are vertical, it is not possible to provide them during the molding operation of this machine with oblong handle apertures similar to the apertures 7 in FIGURES 3 to 5. If such handle apertures are required, they must be stamped out of the respective walls.

The machine according to FIGURES 6 to 8 and the method of operating the same may be employed for molding boxes of different shapes with vertical side walls which may be used, for example, as furniture drawers, storage containers, and the like, several types of which are shown in FIGURES 10 to 15. If the drain holes in the bottom of the container are to be omitted so that the bottom 59 will be solid, the centering pins 53 on cores 54 and the apertures 52 in die plate 51 must be omitted. The side walls 60 extend vertically to the bottom 59. Cores 54 must be of a shape in accordance with the different shapes of the compartments 61 to 64.

If the movable pressure plates 55 are omitted and replaced in mold 57 by solid wall portions, it is also possible to mold partition units without outer walls 60 which may be employed as inserts for plain boxes.

While the machine according to FIGURES 1 and 2 is primarily intended for producing boxes of the kind as shown in FIGURES 3 to 5, in which only two opposite walls are inclined, while the other side walls are vertical, it is, of course, also possible to produce boxes in which all side walls are inclined and of the same height by making all of the walls of the upper die 19 inclined and of the same height as the walls 44 in FIGURE 1. The machine according to FIGURES 1 and 2 may also be modified so that the two inclined walls 3 of the box are molded by the inclined walls 44 of the die, while the two vertical walls are produced by lateral pressure plates 55, as shown in FIGURES 6 to 8.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A machine for producing boxlike containers each having a bottom, side walls, an open side opposite to said bottom, and partitions lower than said side walls and forming a plurality of compartments above said bottom, comprising two presses having a common axis and movable relatively to each other, a stationary mold intermediate said presses having side walls and a bottom and having one open side opposite to said bottom adapted to receive loose but non-flowing molding materials comprising at least one mixture of a finely divided fibrous materials and a binder of a heat-setting plastic, said bottom forming a stationary core of a size and shape in accordance with those of the area of said container between its side walls above said partitions, said stationary core having apertures, a plurality of cores connected to and movable by one of said presses and extending through said apertures into said mold and parallel to the axis of said presses, each of said movable cores having a cross-sectional size and shape in accordance with those of said compartments and being spaced from each other in accordance with the thickness of said partitions, said first press being adapted to elevate said movable cores to a certain higher level in said mold to permit the proper amount of material to be filled into said mold and between said movable cores, and a die mounted on the second press and means for reciprocating said die and for moving said die into the open side of said mold to compress said materials therein by a single compression stroke to the final size and shape of said container and during said compression for depressing said movable cores in said mold to a certain lower level equal to the height of said partitions.

2. A machine for producing boxlike containers each having a bottom, side walls, an open side opposite to said bottom, and partitions lower than said side walls and forming a plurality of compartments above said bottom, comprising two presses having a common axis and movable relatively to each other, a stationary mold intermediate said presses having side walls and a bottom and having one open side opposite to said bottom adapted to receive loose but non-flowing molding materials comprising at least one mixture of a finely divided fibrous material and a binder of a heat-setting plastic, said bottom forming a stationary core of a size and shape in accordance with those of the area of said container between its side walls above said partitions, said stationary core having apertures, a plurality of cores connected to and movable by one of said presses and extending through said apertures into said mold and parallel to the axis of said presses, each of said movable cores having a cross-sectional size and shape in accordance with those of said compartments and being spaced from each other in accordance with the thickness of said partitions, said first press being adapted to elevate said movable cores to a certain higher level in said mold to permit the proper amount of material to be filled into said mold and between said movable cores and also a layer of said materials of a certain thickness to be deposited upon the free ends of said movable cores, and a die mounted on the second press and means for reciprocating said die and for moving said die into the open side of said mold to compress said materials therein by a single compression stroke to the final size and shape of said container and during said compression for depressing said movable cores in said mold to a certain lower level equal to the height of said partitions and also to compress said layer to form said bottom of the container.

3. A machine for producing boxlike containers each having a bottom, side walls, an open side opposite to said bottom, and partitions lower than said side walls and forming a plurality of compartments above said bottom, comprising two presses having a common axis and movable relatively to each other, a stationary mold intermediate said presses having side walls and a bottom and having one open side opposite to said bottom adapted to receive loose but non-flowing molding materials comprising at least one mixture of a finely divided fibrous materials and a binder of a heat-setting plastic, said bottom forming a stationary core of a size and shape in accordance with those of the area of said container between its side walls above said partitions, said stationary core having apertures, a plurality of cores connected to and movable by one of said presses and extending through said apertures into said mold and parallel to the axis of said presses, each of said movable cores having a cross-sectional size and shape in accordance with those of said compartments and being spaced from each other in accordance with the thickness of said partitions, each of said movable cores having an extension on its free upper end of a cross-sectional size smaller than that of said core for producing a central drain aperture in the bottom part of each compartment, said first press being adapted to elevate said movable cores to a certain higher level in said mold to permit the proper amount of material to be filled into said mold and between said movable cores and also a layer of said materials of a certain thickness less than the height of said core extensions to be deposited upon the upper ends of said cores, and a die mounted on the second press and means for reciprocating said die and for moving said die into the open side of said mold to compress said materials therein by a single compression stroke to the final size and shape of said container and during said compression for depressing said movable cores in said mold to a certain lower level equal to the height of said partitions.

4. A machine for producing boxlike containers each having a bottom, side walls, an open side opposite to said bottom, and partitions lower than said side walls and forming a plurality of compartments above said bottom, comprising two presses having a common axis and movable relatively to each other, a stationary mold intermediate said presses having side walls and a bottom and having one open side opposite to said bottom adapted to receive loose but non-flowing molding materials comprising at least one mixture of a finely divided fibrous materials and a binder of a heat-setting plastic, said bottom forming a stationary core of a size and shape in accordance with those of the area of said container between its side walls above said partitions, said stationary core having apertures, a plurality of cores connected to and movable by one of said presses and extending through said apertures into said mold and parallel to the axis of said presses, each of said movable cores having a cross-sectional size and shape in accordance with those of said compartments and being spaced from each other in accordance with the thickness of said partitions, said first press being adapted to elevate said movable cores to a certain higher level in said mold to permit the proper amount of material to be filled into said mold and between said movable cores and also a layer of said materials of a certain thickness to be deposited upon the free ends of said movable cores, and a die mounted on the second press and means for reciprocating said die and for moving said die into the open side of said mold to compress said materials therein by a single compression stroke to the final size and shape of said container and during said compression for depressing said movable cores in said mold to a certain lower level equal to the height of said partitions and also to compress said layer to form said bottom of the container, said die being open at the lower side and comprising side walls and a top plate connecting said side walls, at least two of said side walls of said die opposite to each other being inwardly inclined at least adjacent to said top plate so as to form corresponding side walls on said container with outwardly inclined surfaces.

5. A machine for producing boxlike containers each having a bottom, side walls, an open side opposite to said bottom, and partitions lower than said side walls and forming a plurality of compartments above said bottom, comprising two presses having a common axis and movable relatively to each other, a stationary mold intermediate said presses having side walls and a bottom and having one open side opposite to said bottom adapted to receive loose but non-flowing molding materials comprising at least one mixture of finely divided fibrous materials and a binder of a heat-setting plastic, said bottom forming a stationary core of a size and shape in accordance with those of the area of said container between its side walls above said partitions, said stationary core having apertures, a plurality of cores connected to and movable by one of said presses and extending through said apertures into said mold and parallel to the axis of said presses, each of said movable cores having a cross-sectional size and shape in accordance with those of said compartments and being spaced from each other in accordance with the thickness of said partitions, said first press being adapted to elevate said movable cores to a certain higher level in said mold to permit the proper amount of material to be filled into said mold and between said movable cores and also a layer of said materials of a certain thickness to be deposited upon the free ends of said movable cores, and a die mounted on the second press and means for reciprocating said die and for moving said die into the open side of said mold to compress said materials therein by a single compression stroke to the final size and shape of said container and during said compression for depressing said movable cores in said mold to a certain lower level equal to the height of said partitions and also to compress said layer to form said bottom of the container, said die being open at the lower side and comprising side walls and a top plate connecting said side walls, at least two of said side walls of said die opposite to each other being inwardly inclined at least adjacent to said top plate so as to form corresponding side walls on said container with outwardly inclined surfaces, and associated cutting projections on said stationary core and on the side walls of said die for forming a handle aperture in each of the inclined side walls of said container near the upper free edge thereof.

6. A machine for producing boxlike containers each having a bottom, side walls, an open side opposite to said bottom, and partitions lower than said side walls and forming a plurality of compartments above said bottom, comprising two presses having a common axis and movable relatively to each other, a stationary mold intermediate said presses having side walls and a bottom and having one open side opposite to said bottom adapted to receive loose but non-flowing molding materials comprising at least one mixture of a finely divided fibrous materials and a binder of a heat-setting plastic, said bottom forming a stationary core of a size and shape in accordance with those of the area of said container between its side walls above said partitions, said stationary core having apertures, a plurality of cores connected to and movable by one of said presses and extending through said apertures into said mold and parallel to the axis of said presses, each of said movable cores having a cross-sectional size and shape in accordance with those of said compartments and being spaced from each other in accordance with the thckness of said partitions, said first press being adapted to elevate said movable cores to a certain higher level in said mold to permit the proper amount of material to be filled into said mold and between said movable cores, a die mounted on the second press and means for reciprocating said die and for moving said die into the open side of said mold to compress said materials therein by a single compression stroke to the final size and shape of said container and during said compression for depressing said movable cores in said mold to a certain lower level equal to the height of said partitions, said die comprising a flat plate of a size so as to engage slidably along said side walls of said mold, said side walls of said mold having apertures each of a width equal to the width substantially corresponding to the width of the side walls of said container, a plurality of pressure plates each slidable within one of said apertures in said side walls in a direction at an angle to said axis of said presses for compressing said material forming the side walls of said container, and hydraulic means for moving said pressure plates.

7. A machine for producing boxlike containers each having a bottom, side walls, an open side opposite to said bottom, and partitions lower than said side walls and forming a plurality of compartments above said bottom, comprising two presses having a common axis and movable relatively to each other, a stationary mold intermediate said presses having side walls and a bottom and having one open side opposite to said bottom adapted to receive loose but non-flowing molding materials comprising at least one mixture of a finely divided fibrous materials and a binder of a heat-setting plastic, said bottom forming a stationary core of a size and shape in accordance with those of the area of said container between its side walls above said partitions, said stationary core having apertures, a plurality of cores connected to and movable by one of said presses and extending through said apertures into said mold and parallel to the axis of said presses, each of said movable cores having a cross-sectional size and shape in accordance with those of said compartments and being spaced from each other in accordance with the thickness of said partitions, each of said movable cores having an extension on its free upper end of a cross-sectional size smaller than that of said core for producing a central drain aperture in the bottom part of each compartment, said first press being adapted to elevate said movable cores to a certain higher level in said mold to permit the proper amount of material to be filled into said mold and between said movable cores and also a layer of said materials of a certain thickness less than the height of said core extensions to be deposited upon the upper ends of said cores, and a die mounted on the second press and means for reciprocating said die and for moving said die into the open side of said mold to compress said materials therein by a single compression stroke to the final size and shape of said container and during said compression for depressing said movable cores in said mold to a certain lower level equal to the height of said partitions and also to compress said layer to form said bottom of the container with said drain apertures therein, said die comprising a plate having apertures to receive said core extensions for guiding and centering said cores during the compression stroke of said die.

8. A machine for producing boxlike containers each having a bottom, side walls, an open side opposite to said bottom, and partitions lower than said side walls and forming a plurality of compartments above said bottom, comprising two presses having a common axis and movable relatively to each other, a stationary mold intermediate said presses having side walls and a bottom and having one open side opposite to said bottom adapted to receive loose but non-flowing molding materials comprising at least one mixture of a finely divided fibrous materials and a binder of a heat-setting plastic, said bottom forming a stationary core of a size and shape in accordance with those of the area of said container between its side walls above said partitions, said stationary core having apertures, a plurality of cores connected to and movable by one of said presses and extending through said apertures into said mold and parallel to the axis of said presses, each of said movable cores having a cross-sectional size and shape in accordance with those of said compartments and being spaced from each other in accordance with the thickness of said partitions, said first press being adapted to elevate said movable cores to a certain higher level in said mold to permit the proper amount of material to be filled into said mold and between said movable cores, a die mounted on the second press and means for reciprocating said die and for moving said die into the open side of said mold to compress said materials therein by a single compression stroke to the final size and shape of said container and during said compression for depressing said movable cores in said mold to a certain lower level equal to the height of said partitions and stop means for preventing said movable cores to be depressed by said die beyond said lower level.

9. A machine for producing boxlike containers each having a bottom, side walls, an open side opposite to said bottom, and partitions lower than said side walls and forming a plurality of compartments above said bottom, comprising two presses having a common axis and movable relatively to each other, a stationary mold intermediate said presses having side walls and a bottom and having one open side opposite to said bottom adapted to receive loose but non-flowing molding materials comprising at least one mixture of a finely divided fibrous materials and a binder of a heat-setting plastic, said bottom forming a stationary core of a size and shape in accordance with those of the area of said container between its side walls above said partitions, said stationary core having apertures, a plurality of cores connected to and movable by one of said presses and extending through said apertures into said mold and parallel to the axis of said presses, each of said movable cores having a cross-sectional size and shape in accordance with those of said compartments and being spaced from each other in accordance with the thickness of said partitions, said first press being adapted to elevate said movable cores to a certain higher level in said mold to permit the proper amount of material to be filled into said mold and between said movable cores, a die mounted on the second press and means for reciprocating said die and for moving said die into the open side of said mold to compress said materials therein by a single compression stroke to the final size and shape of said container and during said compression for depressing said movable cores in said mold to a certain lower level equal to the height of said partitions, means for equally distributing the proper amount of said materials in said mold and between said movable cores, and means for moving said distributing means from one side into the area between said mold and said die when in the raised position and into a position in vertical alignment with said mold and said die and for retracting said distributing means from said area after said mold is filled.

10. A machine for producing boxlike containers each having a bottom, side walls, an open side opposite to said bottom, and partitions lower than said side walls and forming a plurality of compartments above said bottom, comprising two presses having a common axis and movable relatively to each other, a stationary mold intermediate said presses having side walls and a bottom and having one open side opposite to said bottom adapted to receive loose but non-flowing molding materials comprising at least one mixture of a finely divided fibrous materials and a binder of a heat-setting plastic, said bottom forming a stationary core of a size and shape in accordance with those of the area of said container between its side walls above said partitions, said stationary core having apertures, a plurality of cores connected to and movable by one of said presses and extending through said apertures into said mold and parallel to the axis of said presses, each of said movable cores having a cross-sectional size and shape in accordance with those of said compartments and being spaced from each other in accordance with the thickness of said partitions, said first press being adapted to elevate said movable cores to a certain higher level in said mold to permit the proper amount of material to be filled into said mold and between said movable cores, a die mounted on the second press and means for reciprocating said die and for moving said die into the open side of said mold to compress said materials therein by a single compression stroke to the final size and shape of said container and during said compression for depressing said movable cores in said mold to a certain lower level equal to the height of said partitions, means for equally distributing the proper amount of said materials in said mold and between said movable cores, and means for moving said distributing means from one side into the area between said mold and said die when in the raised position and into a position in vertical alignment with said mold and said die and for retracting said distributing means from said area after said mold is filled, said distributing means comprising a funnel-shaped hopper and a plurality of distributing members mounted in said hopper having distributing heads of a substantially conical central vertical section in vertical alignment with said movable cores when said distributing means are moved into said position and spaced from each other by gaps of a size substantially in accordance with the distance between said cores.

11. A machine for producing boxlike containers each having a bottom, side walls, an open side opposite to said bottom, and partitions lower than said side walls and forming a plurality of compartments above said bottom, comprising two presses having a common axis and movable relatively to each other, a stationary mold intermediate said presses having side walls and a bottom and having one open side opposite to said bottom adapted to receive loose but non-flowing molding materials comprising at least one mixture of a finely divided fibrous materials and a binder of a heat-setting plastic, said bottom forming a stationary core of a size and shape in accordance with those of the area of said container between its side walls above said partitions, said stationary core having apertures, a plurality of cores connected to and movable by one of said presses and extending through said apertures into said mold and parallel to the axis of said presses, each of said movable cores having a cross-sectional size and shape in accordance with those of said compartments and being spaced from each other in accordance with the thickness of said partitions, said first press being adapted to elevate said movable cores to a certain higher level in said mold to permit the proper amount of material to be filled into said mold and between said movable cores, a die mounted on the second press and means for reciprocating said die and for moving said die into the open side of said mold to compress said materials therein by a single compression stroke to the final size and shape of said container and during said compression for depressing said movable cores in said mold to a certain lower level equal to the height of said partitions, means for equally distributing the proper amount of said materials in said mold and between said movable cores, and means for moving said distributing means from one side into the area between said mold and said die when in the raised position and into a position in vertical alignment with said mold and said die and for retracting said distributing means from said area after said mold is filled, said distributing means comprising a funnel-shaped hopper, a plurality of distributing members mounted in said hopper having distributing heads of a substantially conical central vertical section in vertical alignment with said movable cores when said distributing means are moved into said position and spaced from each other by gaps of a size substantially in accordance with the distance between said cores, wedge-shaped closing members adapted to be inserted in said gaps for closing the same, and a wire screen for supporting said closing members and, when elevated, adapted to lift all of said closing members simultaneously out of said gaps to permit the molding material to drop through said gaps into said mold.

12. A machine for producing boxlike containers each having a bottom, side walls, an open side opposite to said bottom, and partitions lower than said side walls and forming a plurality of compartments above said bottom, comprising two presses having a common axis and movable relatively to each other, a stationary mold intermediate said presses having side walls and a bottom and having one open side opposite to said bottom adapted to receive loose but non-flowing molding materials comprising at least one mixture of a finely divided fibrous materials and a binder of a heat-setting plastic, said bottom forming a stationary core of a size and shape in accordance with those of the area of said container between its side walls above said partitions, said stationary core having apertures, a plurality of cores connected to and movable by one of said presses and extending through said apertures into said mold and parallel to the axis of said presses, each of said movable cores having a cross-sectional size and shape in accordance with those of said compartments and being spaced from each other in accordance with the thickness of said partitions, said first press being adapted to elevate said movable cores to a certain higher level in said mold to permit the proper amount of material to be filled into said mold and between said movable cores, a die mounted on the second press and means for reciprocating said die and for moving said die into the open side of said mold to compress said materials therein by a single compression stroke to the final size and shape of said container and during said compression for depressing said movable cores in said mold to a certain lower level equal to the height of said partitions, means for equally distributing the proper amount of said materials in said mold and between said movable cores, and means for moving said distributing means from one side into the area between said mold and said die when in the raised position and into a position in vertical alignment with said mold and said die and for retracting said distributing means from said area after said mold is filled, said distributing means comprising a funnel-shaped outer hopper for holding and dispensing said molding materials of at least one composition, an inner hopper coaxial with said outer hopper for holding and dispensing said molding materials of at least one other composition, said two hoppers being movable in the axial direction relative to each other from a closed position in which the lower ends of said hoppers fully engage with each other to an open position in which said lower ends are vertically spaced from each other and the lower end of said outer hopper is open, a plurality of distributing members mounted in one of said hoppers and having distributing heads of a substantially conical central vertical section in vertical alignment with said movable cores when said distributing means are moved into said position of alignment between said mold and said die and spaced from each other by gaps of a size substantially in accordance with the distance between said cores, wedge-shaped closing members adapted to be inserted in said gaps for closing the same when said two hoppers are moved relative to each other from said open position to said closed position and a wire screen mounted in the other hopper for supporting said closing members, whereby said molding materials of at least two different compositions may be filled into specific different parts of said mold.

13. A machine for producing boxlike containers each having a bottom, side walls, an open side opposite to said bottom, and partitions lower than said side walls and forming a plurality of compartments above said bottom, comprising two presses having a common axis and movable relatively to each other, a stationary mold intermediate said presses having side walls and a bottom and having one open side opposite to said bottom adapted to receive loose but non-flowing molding materials comprising at least one mixture of a finely divided fibrous materials and a binder of a heat-setting plastic, said bottom forming a stationary core of a size and shape in accordance with those of the area of said container between its side walls above said partitions, said stationary core having apertures, a plurality of cores connected to and movable by one of said presses and extending through said apertures into said mold and parallel to the axis of said presses, each of said movable cores having a cross-sectional size and shape in accordance with those of said compartments and being spaced from each other in accordance with the thickness of said partitions, said first press being adapted to elevate said movable cores to a certain higher level in said mold to permit the proper amount of material to be filled into said mold and between said movable cores, a die mounted on the second press and means for reciprocating said die and for moving said die into the open side of said mold to compress said materials therein by a single compression stroke to the final size and shape of said container and during said compression for depressing said movable cores in said mold to a certain lower level equal to the height of said partitions, means for equally distributing the proper amount of said materials in said mold and between said movable cores, and means for moving said distributing means from one side into the area between said mold and said die when in the raised position and into a position in vertical alignment with said mold and said die and for retracting said distributing means from said area after said mold is filled, said moving means comprising rails leading from one side into said area, wheels on said distributing means movable along said rails, and releasable means for arresting said distributing means when moved into said position of alignment.

14. A machine for producing boxlike containers each having a bottom, side walls, an open side opposite to said bottom, and partitions lower than said side walls and forming a plurality of compartments above said bottom, comprising two presses having a common axis and movable relatively to each other, a stationary mold intermediate said presses having side walls and a bottom and having one open side opposite to said bottom adapted to receive loose but non-flowing molding materials comprising at least one mixture of a finely divided fibrous materials and a binder of a heat-setting plastic, said bottom forming a stationary core of a size and shape in accordance with those of the area of said container between its side walls above said partitions, said stationary core having apertures, a plurality of cores connected to and movable by one of said presses and extending through said apertures into said mold and parallel to the axis of said presses, each of said movable cores having a cross-sectional size and shape in accordance with those of said compartments and being spaced from each other in accordance with the thickness of said partitions, said first press being adapted to elevate said movable cores to a certain higher level in said mold to permit the proper amount of material to be filled into said mold and between said movable cores, a die mounted on the second press and means for reciprocating said die and for moving said die into the open side of said mold to compress said materials therein by a single compression stroke to the final size and shape of said container and during said compression for depressing said movable cores in said mold to a certain lower level equal to the height of said partitions. means for equally distributing the proper amount of said materials in said mold and between said movable cores, and means for moving said distributing means from one side into the area between said mold and said die when in the raised position and into a position in vertical alignment with said mold and said die and for retracting said distributing means from said area after said mold is filled, said distributing means comprising a funnel-shaped outer hopper for holding and dispensing said molding materials of at least one composition, an inner hopper coaxial with said outer hopper for holding and dispensing said molding materials of at least one other composition, said two hoppers being movable in the axial direction relative to each other from a closed position in which the lower ends of said hoppers fully engage with each other to an open position in which said lower ends are verically spaced from each other and the lower end of said outer hopper is open, a plurality of distributing members mounted in one of said hoppers and having distributing heads of a substantially conical central vertical section in vertical alignment with said movable cores when said distributing means are moved into said position of alignment between said mold and said die and spaced from each other by gaps of a size substantially in accordance with the distance between said cores, wedge-shaped closing members adapted to be inserted in said gaps for closing the same when said two hoppers are moved relative to each other from said open position to said closed position and a wire screen mounted in the other hopper for supporting said closing members, said means for moving said distributing means comprising rails leading from one side into said area, wheels on said distributing means movable along said rails, said rails having recesses therein within said area, said wheels being adapted to drop into said recesses for arresting said distributing means in said position of alignment between said mold and said die, said outer hopper being lowered relative to said inner hopper by said dropping of said wheels into said recesses, whereby said gaps and said lower end of said outer hopper are opened to permit said materials of at least two different compositions in said outer and inner hoppers to be filled into specific different parts of said mold, and means for lifting said wheels out of said apertures and back upon said rails after said mold is filled to permit said distributing means to be moved out of said area so that the molding operation can then be carried out.

15. A machine for producing boxlike containers each having a bottom, side walls, an open side opposite to said bottom, and partitions lower than said side walls and forming a plurality of compartments above said bottom, comprising two presses having a common axis and movable relatively to each other, a stationary mold intermediate said presses having side walls and a bottom and having one open side opposite to said bottom adapted to receive loose but non-flowing molding materials comprising at least one mixture of a finely divided fibrous materials and a binder of a heat-setting plastic, said bottom forming a stationary core of a size and shape in accordance with those of the area of said container between its side walls above said partitions, said stationary core having apertures, a plurality of cores connected to and movable by one of said presses and extending through said apertures into said mold and parallel to the axis of said presses, each of said movable cores having a cross-sectional size and shape in accordance with those of said compartments and being spaced from each other in accordance with the thickness of said partitions, said first press being adapted to elevate said movable cores to a certain higher level in said mold to permit the proper amount of material to be filled into said mold and between said movable cores, said first press being also adapted to elevate said movable cores to a still higher level so as to lift the molded container at least partly out of said mold after the molding operation is completed, and a die mounted on the second press and means for reciprocating said die and for moving said die into the open side of said mold to compress said materials therein by a single compression stroke to the final size and shape of said container and during said compression for depressing said movable cores in said mold to a certain lower level equal to the height of said partitions.

16. A machine for producing boxlike containers each having a bottom, side walls, an open side opposite to said bottom, and partitions lower than said side walls and forming a plurality of compartments above said bottom, comprising two presses having a common axis and movable relatively to each other, a stationary mold intermediate said presses having side walls and a bottom and having one open side opposite to said bottom adapted to receive loose but non-flowing molding materials comprising at least one mixture of a finely divided fibrous materials and a binder of a heat-setting plastic, said bottom forming a stationary core of a size and shape in accordance with those of the area of said container between its side walls above said partitions, said stationary core having apertures, a plurality of cores connected to and movable by one of said presses and extending through said apertures into said mold and parallel to the axis of said presses, each of said movable cores having a cross-sectional size and shape in accordance with those of said compartments and being spaced from each other in accordance with the thickness of said partitions, said first press being adapted to elevate said movable cores to a certain higher level in said mold to permit the proper amount of material to be filled into said mold and between said movable cores, said first press being also adapted to elevate said movable cores to a still higher level so as to lift the molded container at least partly out of said mold after the molding operation is completed, a die mounted on the second press and means for reciprocating said die and for moving said die into the open side of said mold to compress said materials therein by a single compression stroke to the final size and shape of said container and during said compression for depressing said movable cores in said mold to a certain lower level equal to the height of said partitions, and ejecting means on said die for automatically ejecting said molded container from said die when said die is retracted after said molding operation.

References Cited in the file of this patent

UNITED STATES PATENTS

| | | |
|---|---|---|
| 2,355,613 | Wacker | Aug. 15, 1944 |
| 2,365,849 | Strauss | Dec. 26, 1944 |
| 2,431,048 | Kilborn | Nov. 18, 1947 |
| 2,552,090 | Eusner | May 8, 1951 |
| 2,562,876 | Baeza | Aug. 7, 1951 |
| 2,584,444 | Gruenberg | Feb. 5, 1952 |
| 2,620,540 | Weir | Dec. 9, 1952 |
| 2,627,086 | Hallenbeck | Feb. 3, 1953 |
| 2,789,336 | Shealy | Apr. 23, 1957 |
| 2,815,535 | Bodine | Dec. 10, 1957 |
| 2,987,777 | Beaver et al. | June 13, 1961 |
| 3,052,919 | Rayburn | Sept. 11, 1962 |
| 3,060,506 | Uschmann | Oct. 30, 1962 |
| 3,127,459 | Bratton | Mar. 31, 1964 |

OTHER REFERENCES

German specification DAS1,044,700, Nov. 20, 1958.